United States Patent
Shibasaki

(10) Patent No.: US 11,568,747 B2
(45) Date of Patent: Jan. 31, 2023

(54) DETERMINATION DEVICE, DETERMINATION METHOD, AND PROGRAM FOR DETERMINATION

(71) Applicant: PIONEER CORPORATION, Tokyo (JP)

(72) Inventor: Hiroaki Shibasaki, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 68 days.

(21) Appl. No.: 16/753,749

(22) PCT Filed: Oct. 1, 2018

(86) PCT No.: PCT/JP2018/036737
§ 371 (c)(1),
(2) Date: Apr. 3, 2020

(87) PCT Pub. No.: WO2019/069868
PCT Pub. Date: Apr. 11, 2019

(65) Prior Publication Data
US 2020/0279488 A1  Sep. 3, 2020

(30) Foreign Application Priority Data

Oct. 4, 2017  (JP) .............................. JP2017-194114

(51) Int. Cl.
*G08G 1/16* (2006.01)
*B60W 60/00* (2020.01)
(Continued)

(52) U.S. Cl.
CPC .......... *G08G 1/167* (2013.01); *B60W 30/0956* (2013.01); *B60W 30/12* (2013.01);
(Continued)

(58) Field of Classification Search
CPC .......... G08G 1/167; G08G 1/166; G08G 1/22; G08G 1/162; G08G 1/161;
(Continued)

(56) References Cited

U.S. PATENT DOCUMENTS 10,089,876 B1 * 10/2018 Ramasamy ............ G08G 1/167
2005/0015203 A1    1/2005 Nishira
(Continued)

FOREIGN PATENT DOCUMENTS

JP    2007-304992 A    11/2007
JP    2009-230377 A    10/2009
(Continued)

OTHER PUBLICATIONS

Extended European Search Report dated Aug. 16, 2021 from counterpart EP Patent Application No. 18864743.2, 8 pages.
International Search Report and Written Opinion for related International Application No. PCT/JP2018/036737, dated Jan. 8, 2019; English translation of ISR provided (7 pages).

Primary Examiner — Abby Y Lin
Assistant Examiner — Dylan M Katz
(74) Attorney, Agent, or Firm — Procopio, Cory, Hargreaves & Savitch LLP

(57) ABSTRACT

Provided is a determination device capable of safely and reliably causing a vehicle on a side road to enter and merge into a main road when merging into the main road. Information is acquired that indicates the vehicle status of vehicles CA, etc., and vehicles Ca, etc., that are traveling on a side road SR that merges with a main road MR on which the vehicles CA, etc., are traveling. When, on the basis of said information, an intervehicular space is to be formed between the vehicles CA, etc., that will make it possible for a vehicle Ca, etc., to enter, the vehicles CA, etc., are caused to form an interval on the basis of the acceleration applied (Continued)

to each of the vehicles CA, etc., and the entering vehicle Ca, etc., is allowed to move to a position in the intervehicular space.

7 Claims, 7 Drawing Sheets

(51) Int. Cl.
  *B60W 30/095* (2012.01)
  *B60W 30/12* (2020.01)
(52) U.S. Cl.
  CPC ......... *B60W 60/0011* (2020.02); *G08G 1/166* (2013.01); *G08G 1/162* (2013.01)
(58) Field of Classification Search
  CPC ............. B60W 30/0956; B60W 30/12; B60W 60/0011; B60W 30/10; B60W 30/18163; B60W 2050/00; B60R 21/00
  See application file for complete search history.

(56) References Cited

U.S. PATENT DOCUMENTS

| | | | | |
|---|---|---|---|---|
| 2014/0107867 | A1* | 4/2014 | Yamashiro | G08G 1/167 701/2 |
| 2014/0316671 | A1* | 10/2014 | Okamoto | G08G 1/22 701/96 |
| 2016/0214612 | A1* | 7/2016 | Kashiba | B60W 10/184 |
| 2016/0267795 | A1* | 9/2016 | Miyazawa | B60W 30/12 |
| 2017/0369067 | A1* | 12/2017 | Saigusa | B60W 30/16 |

FOREIGN PATENT DOCUMENTS

| | | |
|---|---|---|
| JP | 2010-170385 A | 8/2010 |
| JP | 2016-018495 A | 2/2016 |
| JP | 2016-146129 A | 8/2016 |
| JP | 2017-138887 A | 8/2017 |

\* cited by examiner

DETERMINATION DEVICE, DETERMINATION METHOD, AND PROGRAM FOR DETERMINATION

CROSS-REFERENCE TO RELATED APPLICATIONS

This application is a U.S. National Stage entry of PCT Application No: PCT/JP2018/036737 filed Oct. 1, 2018, which claims priority to Japanese Patent Application No. 2017-194114, filed Oct. 4, 2017, the contents of which are incorporated herein by reference.

TECHNICAL FIELD

The present application belongs to the technical field of a determination device, a determination method, and a determination program. More specifically, the present application belongs to the technical field of a determination device and a determination method that perform determination for allowing a second moving object, such as a vehicle, moving on a second road, which merges with a first road, to enter the first road and merge with a line of first moving objects, such as vehicles, moving on the first road, and a program for the determination device.

BACKGROUND ART

In recent years, research and development related to autonomous driving of vehicles have been actively conducted. In order to bring such autonomous driving into more widespread, it is also necessary to enable vehicles to smoothly merge with each other, for example, at a merging point between a side lane and a main lane. Further, as an example of a conventional technique for this, there is a technique disclosed in Patent Literature 1 described below. The technique described in Patent Literature 1 has a configuration in which, taking into consideration the traveling state (e.g., the vehicle speed or the intervehicular distance) of a reference vehicle and vehicles ahead of and behind the reference vehicle traveling on a main lane, that is, a plurality of vehicles traveling on the main lane, and the position, the merging speed, and the like of a vehicle traveling on a side lane, the vehicle on the side lane merges into the main lane without approach between the vehicles on the main lane.

CITATION LIST

Patent Document

Patent Document 1: JP 2010-170385 A

SUMMARY OF THE INVENTION

Problem to be Solved by the Invention

However, even based on the technique described in the above Patent Literature 1, in a case where the vehicle enters the main lane from the side lane and merges with the line of vehicles on the main lane, it is essential that the vehicle traveling on the side lane can smoothly enter and merge into the main lane in addition to securing safety of the vehicles traveling on the main lane.

Further, there is a problem in that congestion on the side lane may occur unless smooth entry and merging can be achieved even in a case where a driver of the vehicle that is traveling on the side lane and going to enter and merge into the main lane has a low driving skill, or the like.

Thus, the present application has been made in view of the above demand and problem, and an example of an object thereof is to provide a determination device and a determination method that are capable of performing determination required to allow, in a case where a vehicle on a side lane merges into a main lane, the vehicle to smoothly and reliably enter the main lane, and a program for the determination device.

Means for Solving the Problem

In order to solve the above-mentioned problem, the invention described in claim 1 comprises: an acquisition means that acquires state information indicating a moving state of each of a plurality of first moving objects moving in the same direction on a first road and a moving state of a second moving object moving on a second road, the second road merging with the first road, and going to enter the first road and move in the direction; and a determination means that acquires, in a case where any of the first moving objects is caused to generate a space for allowing the second moving object to enter the first road, an acceleration applied to the first moving object on the basis of the state information and determines whether to allow the second moving object to enter the space.

In order to solve the above-mentioned problem, the invention described in claim 9 is a determination method executed in a determination device comprising an acquisition means and a determination means, the method comprising: an acquisition step of acquiring, by the acquisition means, state information indicating a moving state of each of a plurality of first moving objects moving in the same direction on a first road and a moving state of a second moving object moving on a second road, the second road merging with the first road, and going to enter the first road and move in the direction; and a determination step of acquiring, in a case where any of the first moving objects is caused to generate a space for allowing the second moving object to enter the first road, an acceleration applied to the first moving object on the basis of the state information and determining, by the determination means, whether to allow the second moving object to enter the space.

MODES FOR CARRYING OUT THE INVENTION

Next, a mode for carrying out the present application will be described with reference to FIG. 1. Note that FIG. 1 is a block diagram illustrating the schematic configuration of a determination device according to an embodiment.

Figure 1:
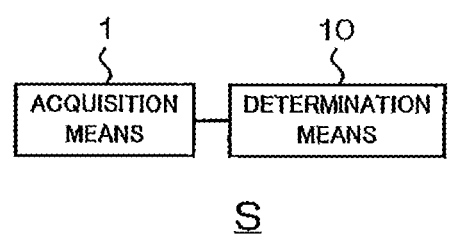
FIG. 1 is a block diagram illustrating the schematic configuration of a determination device according to an embodiment.

As illustrated in FIG. 1, a determination device S according to the embodiment comprises an acquisition means 1 and a determination means 10.

In this configuration, the acquisition means 1 acquires state information indicating a moving state of each of a plurality of first moving objects which are moving in the same direction on a first road and a moving state of a second moving object which is moving on a second road, which merges with the first road, and going to enter the first road and move in the direction.

In a case where any of the first moving objects is caused to generate a space for allowing the second moving object to enter the first road, the determination means 10 then obtains an acceleration applied to the first moving object on the basis of the state information acquired by the acquisition means 1 and determines whether to allow the second moving object to enter the above space.

As described above, according to the determination device S according to the embodiment, in a case where any of the first moving objects is caused to generate the space for allowing the second moving object to enter the first road, it is determined whether to allow the second moving object to enter the above space on the basis of the acceleration applied to the first moving object. Thus, it is possible to perform determination required to smoothly and reliably allow the second moving object to enter the first road.

EXEMPLARY EMBODIMENTS

Next, specific exemplary embodiments corresponding to the embodiment described above will be described with reference to the drawings. Note that each of the exemplary embodiments described below is an exemplary embodiment in a case where the present application is applied to control for allowing, in a case where a plurality of vehicles each of which is equipped with a navigation device are traveling near a merging point between a main lane and a side lane, a vehicle traveling on the side lane to enter the main lane and merge with a line of vehicles on the main lane by autonomous driving. At this time, each of the above vehicles is configured so that information can be exchanged between the vehicles by so-called vehicle-to-vehicle communication. In the above autonomous driving, each of the vehicles is caused to travel without involvement of a driver thereof in principle by using the exchange of information by the above vehicle-to-vehicle communication. Further, examples of the above merging point between the main lane and the side lane include an entrance to an expressway, a merging point from an exit of an expressway to a local road, a merging point from a rest area to an expressway, and the like.

(I) First Exemplary Embodiment

Figure 2:
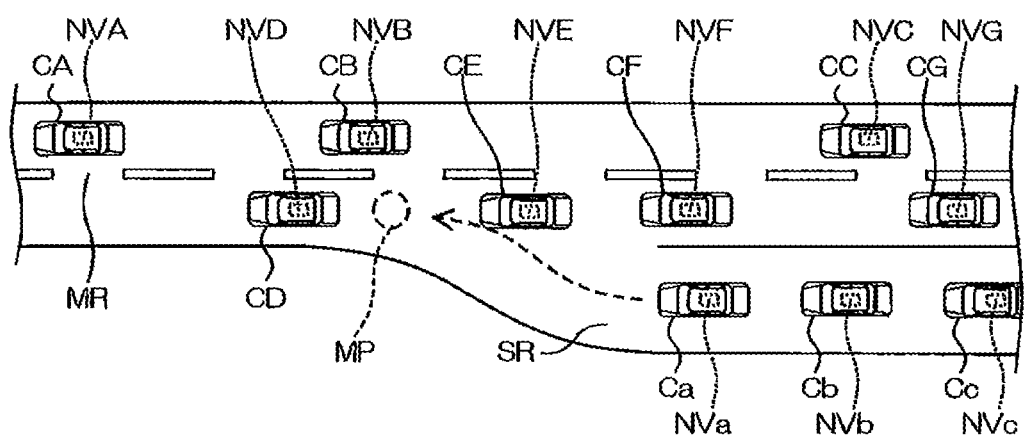
FIG. 2 is a top conceptual diagram illustrating a merging state on a road according to a first exemplary embodiment.
Figure 3:
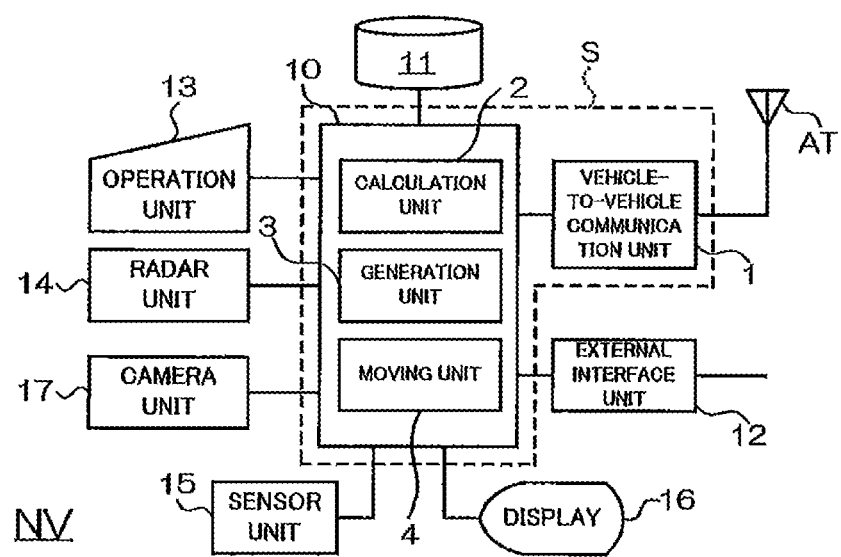
FIG. 3 is a block diagram illustrating the schematic configuration of a navigation device according to the first exemplary embodiment.
Figure 4:
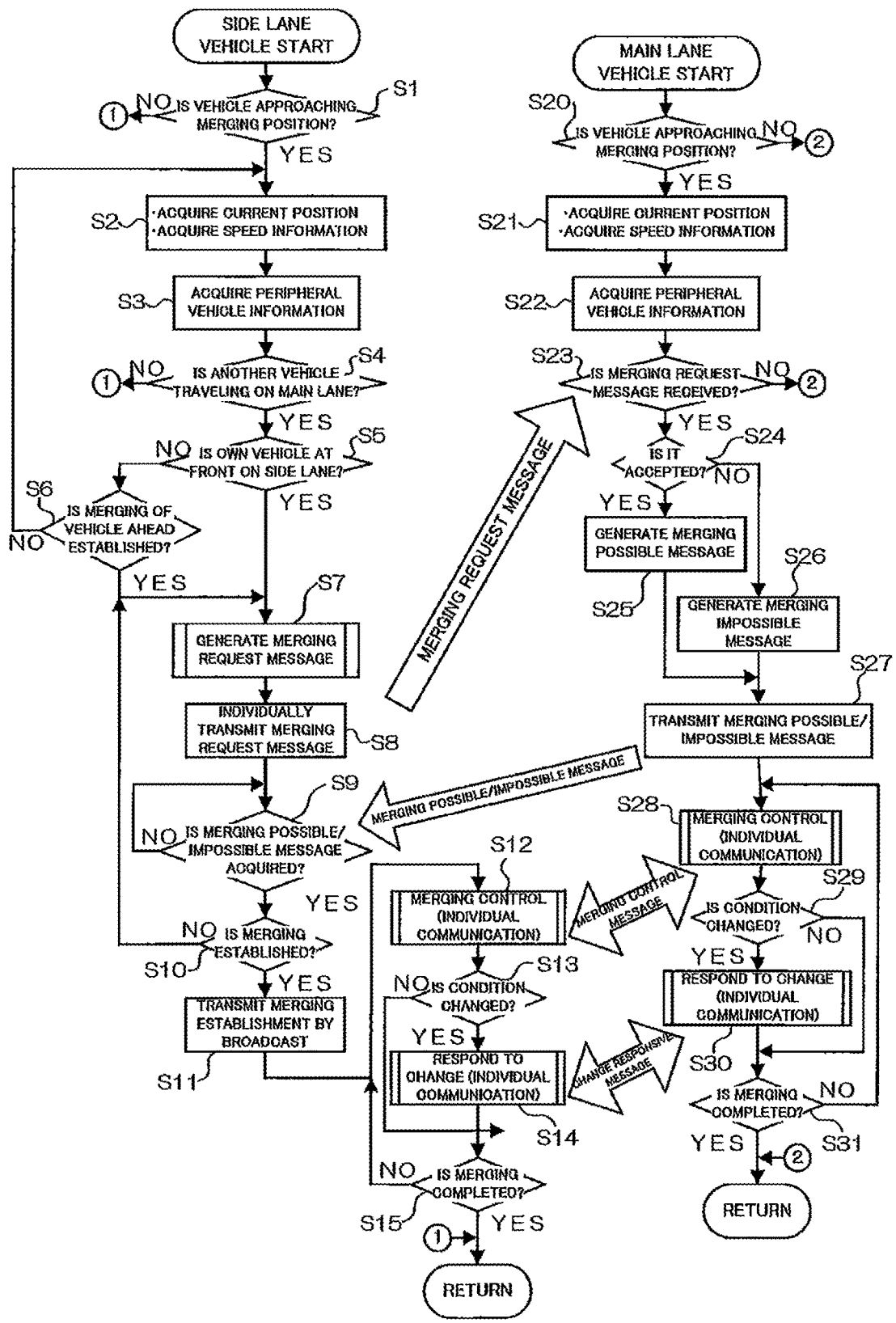
FIG. 4 is a flowchart illustrating the whole of merging control according to the first exemplary embodiment.
Figure 5:
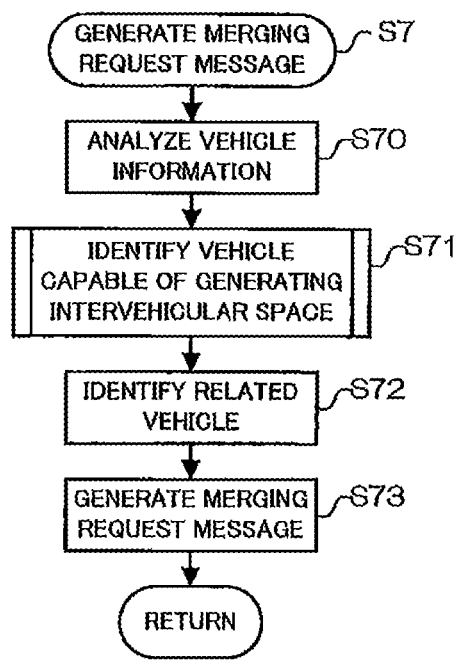
FIG. 5 is a flowchart illustrating details of the merging control according to the first exemplary embodiment.
Figure 6A:
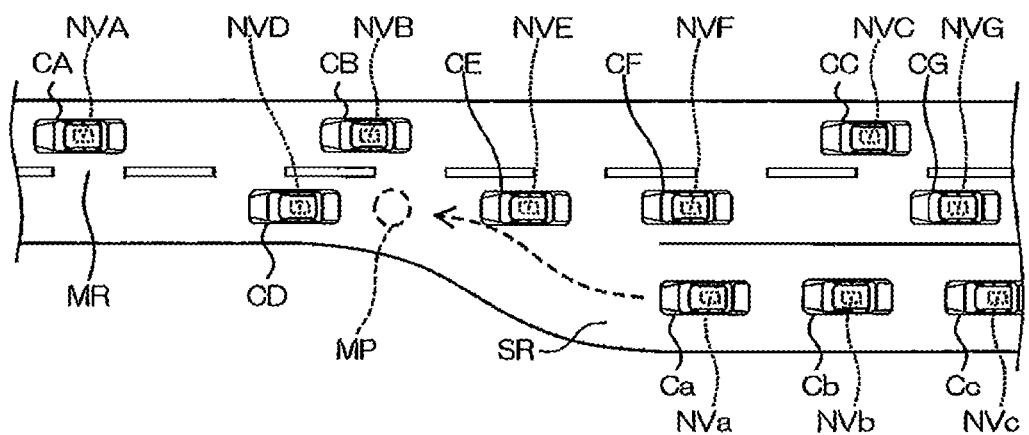
FIG. 6 is a top conceptual diagram illustrating a state of the merging control according to the first exemplary embodiment, in which (a) is a top conceptual diagram illustrating a state in a case where the merging control according to the first exemplary embodiment is not executed, and (b) is a top conceptual diagram illustrating a result of execution of the merging control according to the first exemplary embodiment.

First, a first exemplary embodiment corresponding to the embodiment will be described with reference to FIGS. 2 to 6. Here, FIG. 2 is a top conceptual diagram illustrating a merging state on a road according to the first exemplary embodiment, FIG. 3 is a block diagram illustrating the schematic configuration of a navigation device according to the first exemplary embodiment, and FIG. 4 is a flowchart illustrating the whole of merging control according to the first exemplary embodiment. Further, FIG. 5 is a flowchart illustrating details of the merging control, and FIG. 6 is a top conceptual diagram illustrating a state of the merging control. In this case, in FIG. 3, each component of the first exemplary embodiment corresponding to each component of the determination device S according to the embodiment illustrated in FIG. 1 is designated by the same reference numeral as the component of the determination device S. Further, hereinbelow, control according to the first exemplary embodiment for allowing a vehicle on a side lane to enter a main lane and merge with a line of vehicles on the main lane by autonomous driving is merely referred to as "merging control according to the first exemplary embodiment".

As illustrated in FIG. 2, the merging control according to the first exemplary embodiment is merging control that is executed in a case where, for example, vehicles CA to CG are traveling on a main lane MR, and, for example, vehicles Ca to Cc traveling on a side lane SR sequentially enter the main lane MR through a merging position MP on the main lane MR and merge with a line of the vehicles CA to CG on the main lane MR. Such merging control according to the first exemplary embodiment is autonomously executed as part of the above autonomous driving by navigation devices NVA to NVG, which are respectively mounted on the vehicles CA to CG, and navigation devices NVa to NVc, which are respectively mounted on the vehicles Ca to Cc, while exchanging information therebetween by vehicle-to-vehicle communication.

Note that, in the following description, in a case where a matter common between the vehicles CA to CG and Ca to Cc is described, these vehicles are collectively merely referred to as the "vehicle(s) C". Further, similarly, in a case where a matter common between the navigation devices NVA to NVG and NVa to NVc is descried, these navigation devices are collectively merely referred to as the "navigation device(s) NV".

More specifically, as illustrated in FIG. 3, the navigation device NV according to the first exemplary embodiment comprises a vehicle-to-vehicle communication unit 1, which is provided with an antenna AT, a processing unit 10, which includes a CPU, a random access memory (RAM), a read only memory (ROM) and the like, a recording unit 11, which includes a hard disc drive (HDD), a solid state drive (SSD) or the like, an external interface unit 12, an operation unit 13, which includes a touch panel and/or a remote controller or the like, a radar unit 14, which uses, for example, a millimeter wave or a sound wave, a sensor unit 15, which includes a global positioning system (GPS) sensor, an acceleration sensor and the like, a display 16, which includes a liquid crystal display or the like, and a camera unit 17, which includes a charge coupled device (CCD) images sensor, a complementary metal oxide semiconductor (CMOS) image sensor or the like.

Further, the processing unit 10 comprises a calculation unit 2, a generation unit 3, and a moving unit 4. In this case, each of the calculation unit 2, the generation unit 3, and the moving unit 4 may be implemented by a hardware logic circuit which includes the above CPU or the like included in the processing unit 10 or may be implemented as software by reading a program corresponding to a flowchart illustrating the merging control according to the first exemplary embodiment (described later) from, for example, the recording unit 11 and executing the read program by the processing unit 10.

Further, the above vehicle-to-vehicle communication unit 1 corresponds to an example of the acquisition means 1 according to the embodiment, and the above processing unit 10 corresponds to an example of the determination means 10 according to the embodiment. Further, as indicated by a broken line in FIG. 3, the above vehicle-to-vehicle communication unit 1, the above calculation unit 2, and the above processing unit 10 constitute an example of the determination device S according to the embodiment.

In the above configuration, the vehicle-to-vehicle communication unit 1 performs exchange of information with the navigation device NV disposed on another vehicle C via the antenna AT under control of the processing unit 10. Although a communication range in which the exchange of information by the vehicle-to-vehicle communication unit 1 can be performed varies according to a radio wave condition, the communication range is, for example, typically a range within a radius of a few hundred meters from the vehicle C equipped with the navigation device NV. Further, examples of the information exchanged in this case include vehicle identification information, position information, acceleration information or speed information, vehicle attribute information, occupant attribute information, autonomous driving level information, road information, light ON/OFF information, wiper ON/OFF information, various messages, and the like according to the first exemplary embodiment (described later) for the vehicle C equipped with the navigation device NV including the processing unit 10. These information items including the vehicle identification information or the like are exchanged in a previously set format between the navigation devices NV.

In this case, the above vehicle identification information is vehicle identification information for discriminating the vehicle C equipped with the navigation device NV as a sender of the vehicle identification information from another vehicle C. Further, the above position information is position information indicating a detection result of the position of the navigation device NV (in other words, the position of the vehicle C equipped with the navigation device NV), the position being detected by the above GPS sensor, by the sensor unit 15. More specifically, the position information is, for example, latitude/longitude information indicating the position or relative position information indicating the relative position between the navigation devices NV. Next, the acceleration information is a result obtained by detecting an acceleration which is applied to the navigation device NV due to acceleration or deceleration or right or left turn in the vehicle C equipped with the navigation device NV, an uphill or downhill, or the like by the acceleration sensor of the above sensor unit 15. Next, the speed information is speed information detected by the sensor unit 15 by using a vehicle speed pulse which is detected associated with traveling of the vehicle C or integrating the above acceleration. On the other hand, the vehicle attribute information is information indicating the attribute of the vehicle C equipped with the navigation device NV. More specifically, the vehicle attribute information is information indicating whether the vehicle C is a passenger vehicle or a commercial vehicle (e.g., a truck), information indicating whether the vehicle C is a large vehicle or a small vehicle, information indicating whether the vehicle C is a domestic vehicle or a foreign vehicle, or the like. Next, the occupant attribute information is information indicating the attribute of a driver who drives the vehicle C equipped with the navigation device NV and an occupant. More specifically, the occupant attribute information is information indicating whether the driver is a newly-licensed driver, information indicating whether the driver is an elderly person, information indicating whether an elderly person or a child is riding as an occupant other than the driver and the number of elderly people or children if riding, or the like. Next, the autonomous driving level information is information indicating the state of autonomous driving a certain timing in the vehicle C equipped with the navigation device NV. More specifically, the autonomous driving level information is information indicating a previously set (classified) autonomous driving level and indicating details of the function of the vehicle C to be autonomously controlled in the autonomous driving and the degree of involvement of the driver to the autonomous driving. Next, the road information is information about a road on which the vehicle C equipped with the navigation device NV is traveling. Specifically, the road information is, for example, information indicating the type of the road on which the vehicle C is traveling (e.g., whether the road is an expressway or a local road) or information indicating a lane on which the vehicle C is traveling. Note that examples of the information indicating the lane in this case include information indicating whether the vehicle C is traveling on a slow lane or a passing lane, information indicating the position of a lane on which the vehicle C is traveling on a road including three or more lanes, or the like. Next, the light ON/OFF information is information indicating whether a light (a headlight or a brake light) is on or off in the vehicle C equipped with the navigation device NV. Finally, the wiper ON/OFF information is information indicating whether a wiper is in operation in the vehicle C equipped with the navigation device NV.

Next, the recording unit 11 records therein information or the like required to execute a guide process as the navigation device NV (described later), information required to execute the merging control according to the first exemplary embodiment, and the like, and outputs the recoded information items to the processing unit 10 under the control of the processing unit 10. Further, the external interface unit 12 acquires (receives) congestion information or the like required for the operation of the navigation device NV from, for example, an external network, such as the Internet, or a vehicle information and communication system (VICS (registered trademark)), and outputs the acquired information to the processing unit 10 under the control of the processing unit 10. On the other hand, in a case where a user has executed, for example, a designation operation for designating the operation of the navigation device NV on the operation unit 13, the operation unit 13 generates an operation signal corresponding to the operation, and outputs the generated operation signal to the processing unit 10. Further, under the control of the processing unit 10, the radar unit 14 transmits, for example, the above millimeter wave or sound wave, detects the presence of another vehicle C traveling ahead of or behind the vehicle C equipped with the navigation device NV or traveling on an adjacent lane, the distance to the other vehicle C, and the like on the basis of a reflected wave of the transmitted millimeter wave or sound wave or the like, and outputs a result of the detection to the processing unit 10. Note that, as another method for detecting the distance between the vehicle C equipped with the navigation device NV and the above other vehicle C, for example, there is also a method that detects the distance in the vehicle C equipped with the navigation device NV by directly acquiring (receiving) the above position information indicating the position of the other vehicle C from the other vehicle C. Next, the sensor unit 15 outputs each of position information indicating the position of the vehicle C equipped with the navigation device NV and acceleration information indicating the acceleration applied to the vehicle C as detection results obtained by the above GPS sensor and the above acceleration sensor to the processing unit 10 under the control of the processing unit 10. Finally, the camera unit 17 outputs image information as a result of imaging in an imaging range which is previously set range around the vehicle C equipped with the navigation device NV to the processing unit 10 under the control of the processing unit 10.

Further, the processing unit 10 performs the guide process as the navigation device NV in response to the operation signal from the above operation unit 13 on the basis of the congestion information or the like from the above external interface unit 12, the detection result in the above radar unit 14, the position information or the like from the above sensor unit 15, and the image information from the above camera unit 17 in addition to each piece of information exchanged by the above vehicle-to-vehicle communication. Note that the information required for the guide process is temporarily recorded in the recording unit 11, read by the processing unit 10 as needed, and used in the guide process. Further, the program or the like corresponding to the guide process is also recorded in the recording unit 11, read by the processing unit 10 as needed, and used in the guide process. Further, route guide or the like as a result of the guide process is executed using display of a map or the like on the display 16, voice guide through a speaker (not illustrated), and the like under the control of the processing unit 10. Note that, in a case where the vehicle C equipped with the navigation device NV is traveling under a previously set autonomous driving level, part or the whole of the above guide process is executed by autonomous driving corresponding to the autonomous driving level.

In addition to this, the calculation unit 2, the generation unit 3, and the moving unit 4 of the processing unit 10 execute the merging control according to the first exemplary embodiment illustrated by a flowchart (described later) as part of the above guide process. At this time, the calculation unit 2 and the like execute the merging control according to the first exemplary embodiment on the basis of each piece of information exchanged by the above vehicle-to-vehicle communication, the above congestion information or the like, the detection result in the above radar unit 14, the above vehicle identification information or the like, and the above image information.

Next, the merging control according to the first exemplary embodiment will be specifically described with reference to FIGS. 4 to 6. Here, a flowchart on the left side of FIG. 4 is a flowchart illustrating a process executed in the navigation devices NVa to NVc, which are respectively mounted on the vehicles Ca to Cc, which are traveling on the side lane SR illustrated in FIG. 2 and going to enter the main lane MR, as part of the merging control according to the first exemplary embodiment. On the other hand, a flowchart on the right side of FIG. 4 is a flowchart illustrating a process executed in the navigation devices NVA to NVG, which are respectively mounted on the vehicles CA to CG, which are traveling on the main lane MR illustrated in FIG. 2, as part of the merging control according to the first exemplary embodiment. Further, the process corresponding to each of the flowcharts illustrated in FIG. 4 is executed, for example, every certain time mainly by the processing unit 10 of the navigation device NV.

Note that, in the following description, in a case where a matter common between the vehicles Ca to Cc, which are respectively equipped with the navigation devices NVa to NVc, is described, these vehicles are collectively referred to as the "vehicles Ca and the like (vehicle Ca or the like)". Further, in a case where a matter common between the navigation devices NVa to NVc is described, these navigation device are collectively referred to as the "navigation devices NVa and the like (navigation device NVa or the like)". Further, a matter common between the vehicles CA to CG, which are respectively equipped with the navigation devices NVA to NVG, is described, these vehicles are collectively referred to as the "vehicles CA and the like (vehicle CA or the like)". Further, a matter common between the navigation devices NVA to NVG is described, these navigation devices are collectively referred to as the "navigation devices NVA and the like (navigation device NVA or the like)".

Further, in the navigation devices NVa and the like, it is previously set, by, for example, route setting, that the vehicles Ca and the like equipped with the navigation devices NVa and the like travel on the side lane SR and enter the main lane MR through the merging position MP. Further, in the navigation devices NVA and the like, it is previously set that the merging position MP of the vehicles Ca and the like from the side lane SR is located on the main lane MR.

As illustrated on the left of FIG. 4, when the merging control according to the first exemplary embodiment is started, the processing unit 10 of the navigation device NVa or the like, which is mounted on the vehicle Ca or the like traveling on the side lane SR, monitors whether the vehicle Ca or the like is approaching the merging position MP, that is, whether the vehicle Ca or the like has traveled to a position away from the merging position MP by a previously set distance (step S1). In a case where the vehicle Ca or the like is not approaching the merging position MP in the monitoring in step S1 (step S1: NO), the processing unit 10 shifts to the original guide process with respect to the vehicle Ca or the like. On the other hand, in a case where the vehicle Ca or the like is approaching the merging position MP in the monitoring in step S1 (step S1: YES), the processing unit 10 then acquires position information and speed information which respectively indicate the current position and the current speed of the vehicle Ca or the like equipped with the navigation device NVa or the like including the processing unit 10 from the sensor unit 15 (step S2). Next, the processing unit 10 acquires vehicle information of another vehicle C present within the communication range from the other vehicle C by controlling the vehicle-to-vehicle communication unit 1 (step S3). The vehicle information acquired in step S3 includes the vehicle identification information, the position information, the acceleration information or the speed information, the vehicle attribute information, the occupant attribute information, the autonomous driving level information, the road information, the light ON/OFF information, the wiper ON/OFF information, and the like, which are described above, of the other vehicle C traveling within the above communication range.

Next, the processing unit 10 of the navigation device NVa or the like determines whether another vehicle C is traveling on the main lane MR on the basis of the vehicle information acquired in step S3 (step S4). At this time, the processing unit 10 determines whether another vehicle C is traveling particularly on a merging lane in the main lane MR (in FIG. 2, the left lane of the main lane MR) as step S4. In a case where there is no vehicle C traveling on the main lane MR in the determination in step S4 (step S4: NO), the vehicle Ca or the like traveling on the side lane SR can directly safely enter the main lane MR through the merging position MP. Thus, the processing unit 10 shifts to the original guide process with respect to the vehicle Ca or the like. On the other hand, in a case where there is another vehicle C traveling on the main lane MR in the determination in step S4 (step S4: YES), the processing unit 10 then determines whether the vehicle Ca or the like equipped with the navigation device NVa or the like including the processing unit 10 (in FIG. 4, the vehicle Ca or the like is referred to as the "own vehicle", the same applies to each exemplary embodiment described below) is traveling at the front among the vehicles Ca and the like traveling on the side lane SR, that is, the own vehicle is traveling at a position closest to the merging position MP among the vehicles Ca and the like traveling on the side lane SR (step S5).

In a case where the own vehicle is not traveling at the position closest to the merging position MP, that is, the own vehicle is not traveling at the front among the vehicles Ca and the like traveling on the side lane SR in the determination in step S5 (step S5: NO), the processing unit 10 then determines on the basis of each piece of information acquired in step S3, in particular, the position information whether entry and merging into the main lane MR have been established in another vehicle Ca or the like located ahead of the own vehicle on the side lane SR (step S6, refer to step S11 (described later)). In a case where the entry and merging into the main lane MR have not been established also in the other vehicle Ca or the like in the determination in step S6 (step S6: NO), the processing unit 10 of the own vehicle returns to the above step S2 and repeats the process described above.

On the other hand, in a case where the own vehicle is traveling at the position closest to the merging position MP (that is, the own vehicle is traveling at the front among the vehicles Ca and the like traveling on the side lane SR) in the determination in step S5 (step S5: YES), or in a case where the entry and merging into the main lane MR have been established in the above other vehicle Ca or the like in the determination in step S6 (step S6: YES), the calculation unit 2 and the generation unit 3 of the processing unit 10 of the own vehicle then generate a merging request message requesting that the own vehicle enter the main lane MR through the merging position MP and merge with a line of the vehicles CA and the like for each of the vehicles CA and the like on the main lane MR identified as a destination of the merging request message (step S7). In step S7, in a case where any of the vehicles CA and the like traveling on the main lane MR is accelerated or decelerated to cause the accelerated or decelerated vehicle CA or the like to make an intervehicular space for allowing the own vehicle to enter the main lane MR through the merging position MP, the calculation unit 2 of the processing unit 10 identifies the vehicle CA or the like to be accelerated or decelerated and calculates an acceleration applied in the acceleration or deceleration. Then, the generation unit 3 of the processing unit 10 of the own vehicle generates the above merging request message to the vehicle CA or the like to be accelerated or decelerated with the calculated acceleration. At this time, the merging request message includes an acceleration/deceleration instruction message for accelerating or decelerating the vehicle CA or the like as a destination of the merging request message together with acceleration information indicating the above acceleration calculated for each of the vehicles CA and the like. Details of step S7 will be specifically described later with reference to FIG. 5.

After the generation of the merging request message is performed together with the identification of each of the vehicles CA and the like as the destination thereof in step S7, the generation unit 3 of the processing unit 10 of the own vehicle then transmits the merging request message generated for the identified vehicles CA and the like individually to the identified vehicles CA and the like by controlling the vehicle-to-vehicle communication unit 1 of the own vehicle (step S8). Then, the processing unit 10 of the own vehicle waits for transmission of a merging possible/impossible message responding to the merging request message transmitted in step S8 from the vehicle CA or the like as the destination of the merging request message (step S9, step S9: NO). The merging possible/impossible message is a message indicating whether the acceleration or deceleration indicated by the merging request message is accepted in any of the vehicles CA and the like that have received the above merging request message. The merging possible/impossible message will be described in detail later.

Next, in a case where the merging possible/impossible message has been received from the vehicle CA or the like as the destination of the merging request message during the waiting in step S9 (step S9: YES), the processing unit 10 of the own vehicle determines whether the entry and merging of the own vehicle into the main lane MR through the merging position MP have been accepted (established), that is, whether the intervehicular space required for the own vehicle when arriving at the merging position MP is generated in the vehicles CA and the like on the basis of the received merging possible/impossible message (step S10). In a case where the merging of the own vehicle has not been accepted (established), that is, the above required intervehicular space is not generated in the determination in step S10 (step S10: NO), the processing unit 10 of the own vehicle returns to the above step S7 and repeats the control described above. Note that, at this time, repetitive transmission of the merging request message to the vehicle CA or the like as a sender of the merging possible/impossible message indicating that the merging of the own vehicle has not been accepted is not performed. On the other hand, when the merging of the own vehicle has been accepted (established), that is, the above required intervehicular space is generated at a required position in the determination in step S10 (step S10: YES), the processing unit 10 of the own vehicle then transmits the establishment of the merging of the own vehicle, that is, the generation of the above required intervehicular space at the required position to the navigation device NV of the vehicle C traveling within the communication range by broadcast by controlling the vehicle-to-vehicle communication unit 1 (step S11). In step S11, the processing unit 10 transmits the establishment of the above merging of the own vehicle together with the above vehicle identification information for identifying each of the own vehicle and the vehicle CA or the like that has accepted the merging of the own vehicle to the other vehicle C traveling within the above communication range by the above broadcast. Accordingly, for example, as information useful for both another vehicle Ca or the like following the own vehicle on the side lane SR and another vehicle CA or the like following the vehicle CA or the like in which the merging has been established on the main lane MR, the other vehicle Ca or the like and the other vehicle CA or the like can be caused to acquire information of the vehicle C to be a target of the established merging. At this time, the vehicle identification information and the information indicating that the merging has been established which are transmitted to the other vehicle Ca or the like and the other vehicle CA or the like by the above broadcast are useful, for example, as information for estimating whether a vehicle traveling ahead of the other vehicle Ca or the like or the other vehicle CA or the like decelerates or accelerates in the other vehicle Ca or the like or the other vehicle CA or the like from the standpoint of the other vehicle Ca or the like or the other vehicle CA or the like.

Then, the moving unit 4 of the processing unit 10 of the own vehicle performs control of actual entry and merging into the main lane MR through the merging position MP as part of the autonomous driving of the own vehicle while individually performing exchange of a previously set merging control message or the like with the vehicles CA and the like as the destination of the merging request message transmitted in above step S8 by controlling the vehicle-to-vehicle communication unit 1 of the own vehicle (step S12). Then, the moving unit 4 monitors whether the condition of the entry and merging into the main lane MR by the merging control up to step S12 has changed (step S13). At this time, the moving unit 4 monitors, for example, a positional change of the merging position MP or a change in a scheduled arrival time to the merging position MP. In a case where there is no change in the above condition in the determination in step S13 (step S13: NO), the moving unit 4 performs the control of the entry and merging into the main lane MR on as-is basis and shifts to step S14 (described later). On the other hand, in a case where there is any change in the condition in the determination in step S13 (step S13: YES), the moving unit 4 of the own vehicle performs the control of the entry and merging into the main lane MR while performing exchange of a previously set change responsive message or the like with the vehicles CA and the like with which the above merging control message or the like is exchanged to respond to the change (step S14).

Then, the processing unit 10 of the own vehicle determines whether the entry and merging into the main lane MR have been completed (step S15). In a case where the entry and merging have not been completed in the determination in step S15 (step S15: NO), the moving unit 4 of the own vehicle returns to the above step S12 and repeats the control described above. On the other hand, in a case where the entry and merging into the main lane MR have been completed in the determination in step S15 (step S15: YES), the processing unit 10 shifts to the original guide process with respect to the vehicle Ca or the like.

On the other hand, as illustrated on the right of FIG. 4, when the merging control according to the first exemplary embodiment is started, the processing unit 10 of the navigation device NVA or the like mounted on the vehicle CA or the like traveling on the main lane MR monitors whether the vehicle CA or the like is approaching the merging position MP, that is, the vehicle CA or the like has traveled to a position away from the merging position MP by a previously set distance (step S20). In a case where the vehicle CA or the like is not approaching the merging position MP in the monitoring in step S20, (step S20: NO), the processing unit 10 of the navigation device NVA or the like shifts to the original guide process with respect to the vehicle CA or the like. On the other hand, in a case where the vehicle CA or the like is approaching the merging position MP in the monitoring in step S20, (step S20: YES), the processing unit 10 of the navigation device NVA or the like then acquires position information and speed information which respectively indicate the current position and the current speed of the vehicle CA or the like equipped with the navigation device NVA or the like including the processing unit 10 from the sensor unit 15 (step S21). Next, the processing unit 10 of the navigation device NVA or the like acquires vehicle information about another vehicle C present within the communication range from the other vehicle C by controlling the vehicle-to-vehicle communication unit 1 (step S22). The vehicle information acquired in step S22 includes the vehicle identification information, the position information, the acceleration information or the speed information, the vehicle attribute information, the occupant attribute information, the autonomous driving level information, the road information, the light ON/OFF information, the wiper ON/OFF information, and the like, which are described above, of the other vehicle C traveling within the above communication range as with the vehicle information acquired in the above step S3.

Next, the processing unit 10 of the navigation device NVA or the like monitors whether the above merging request message transmitted from any of the vehicles Ca and the like traveling on the side lane SR has been received (step S23). In a case where the merging request message has been received from none of the vehicles Ca and the like in the monitoring in step S23 (step S23: NO), the processing unit 10 of the navigation device NVA or the like shifts to the original guide process with respect to the vehicle CA or the like. On the other hand, in a case where the merging request message has been transmitted from any of the vehicles Ca and the like in the monitoring in step S23 (step S23: YES), the processing unit 10 of the navigation device NVA or the like then determines whether to accept the entry and merging of the vehicle Ca or the like into the main lane MR based on the received merging request message (step S24). At this time, the processing unit 10 of the navigation device NVA or the like performs the determination of step S24 from the viewpoint whether acceleration or deceleration with the acceleration indicated by the acceleration information included in the received merging request message is possible in the vehicle CA or the like equipped with the navigation device NVA or the like. More specifically, the processing unit 10 of the navigation device NVA or the like determines that the entry and merging are not accepted, for example, in a case where the acceleration or deceleration with the acceleration indicated by the acceleration information which is included in the received merging request message cannot be performed for the reason that a driver is an elderly person or an infant is included in occupants in the vehicle CA or the like that has received the merging request message. On the other hand, in a case where there is no particular reason why the entry and merging cannot be accepted as above, the processing unit 10 of the navigation device NVA or the like determines that the entry and merging are accepted. Note that information indicating the reason why the entry and merging cannot be accepted is preferably previously input and recorded in the recording unit 11 by a driver or a responsible person of each vehicle C. Further, in addition to the above, the processing unit 10 of the navigation device NVA or the like may be configured to determine that the entry and merging are accepted also in a case where the entry and merging of the vehicle Ca or the like are enabled by a lane change of the vehicle CA or the like that has received the merging request message (that is, a lane change to a lane that does not include the merging position MP on the main lane MR).

In the determination in step S24 as described above, in a case where the entry and merging of the vehicle Ca or the like into the main lane MR based on the received merging request message are acceptable (step S24: YES), the processing unit 10 of the navigation device NVA or the like generates a merging possible message indicating that the entry and merging can be accepted (step S25). On the other hand, in a case where the entry and merging of the vehicle Ca or the like into the main lane MR based on the received merging request message are unacceptable (step S24: NO), the processing unit 10 of the navigation device NVA or the like generates a merging impossible message indicating that the entry and merging cannot be accepted (step S26). Then, the processing unit 10 of the navigation device NVA or the like transmits the above merging possible/impossible message including at least either the above merging possible message or the above merging impossible message to any of the vehicles Ca and the like as the sender of the above merging request message (step S27).

Then, the moving unit 4 of the processing unit 10 of the navigation device NVA or the like performs control of actual entry and merging of the vehicle Ca or the like into the main lane MR through the merging position MP as part of the autonomous driving while individually performing exchange of the above merging control message or the like with the vehicle Ca or the like as the sender of the merging request message received in the above step S23 by controlling the vehicle-to-vehicle communication unit 1 of the navigation device NVA or the like (step S28). Then, the processing unit 10 of the navigation device NVA or the like monitors whether the condition of the entry and merging of the vehicle Ca or the like into the main lane MR by the merging control up to step S28 has changed (step S29). At this time, the processing unit 10 of the navigation device NVA or the like monitors, for example, a positional change of the merging position MP or a change in a scheduled arrival time to the merging position MP. In a case where there is no change in the above condition in the determination in step S29 (step S29: NO), the processing unit 10 of the navigation device NVA or the like performs the control of the entry and merging of the vehicle Ca or the like into the main lane MR on as-is basis and shifts to step S31 (described later). On the other hand, in a case where there is any change in the condition in the determination in step S29 (step S29: YES), the processing unit 10 of the navigation device NVA or the like performs the control of the entry and merging of the vehicle Ca or the like into the main lane MR while performing exchange of a previously set change responsive message or the like with the vehicle Ca or the like with which the above merging control message or the like is exchanged to respond to the change (step S30).

Then, the processing unit 10 of the navigation device NVA or the like determines whether the entry and merging of the vehicle Ca of the like into the main lane MR have been completed (step S31). In a case where the entry and merging have not been completed in the determination of step S31 (step S31: NO), the processing unit 10 of the navigation device NVA or the like returns to the above step S28 and repeats the control described above. On the other hand, in a case where the entry and merging have been completed in the determination in step S31 (step S31: YES), the processing unit 10 of the navigation device NVA or the like shifts to the original guide process with respect to the vehicle CA or the like.

Next, the generation of the merging request message as the above step S7 will be more specifically described with reference to FIG. 5.

Specifically, as illustrated in FIG. 5, in step S7, the calculation unit 2 of the processing unit 10 of the own vehicle analyzes details of the vehicle information of the vehicles CA and the like acquired in step S3 illustrated in FIG. 4 to detect the positional relationship between each of the vehicles CA and the like and the own vehicle, a speed difference, and the position, the length, and the like of the current intervehicular space between each of the vehicles CA and the like (step S70). Next, as described above, the calculation unit 2 of the processing unit 10 of the own vehicle identifies the vehicle CA or the like that can be accelerated or decelerated for causing the vehicle CA or the like to make the intervehicular space for allowing the own vehicle to enter the main lane MR through the merging position MP (step S71). At this time, the calculation unit 2 identifies the vehicle CA or the like capable of making the intervehicular space, for example, from the following viewpoint on the basis of the above vehicle attribute or the above occupant attribute of the vehicle CA or the like.

The intervehicular space is not generated behind a large vehicle which obstructs the forward visibility in a case where the vehicle Ca or the like merges behind the large vehicle.

The intervehicular space is not generated ahead of the vehicle CA or the like in which the driver is an elderly person or an infant is riding.

The intervehicular space is not generated at a position where the vehicle Ca or the like requires hard acceleration or deceleration.

Further, in addition, the calculation unit 2 calculates an acceleration applied to accelerate or decelerate the identified vehicle CA or the like.

Next, the calculation unit 2 identifies another vehicle CA or the like related to the vehicle CA or the like identified as one being caused to generate the intervehicular space (step S72). Here, the vehicle CA or the like identified as one being caused to generate the intervehicular space includes at least the vehicle CA or the like constituting the intervehicular space on the rear side thereof. Further, the calculation unit 2 identifies the vehicle CA or the like traveling further ahead of or behind the vehicle CA or the like constituting the intervehicular space to be generated as the above related other vehicle CA or the like. Further, in a case where it is necessary to accelerate or decelerate the identified other vehicle CA or the like, the calculation unit 2 also calculates an acceleration applied in the acceleration or the deceleration.

Then, the calculation unit 2 generates the above merging request message separately to the vehicle CA or the like constituting the intervehicular space to be generated and the above other vehicle CA or the like (step S73). The merging request message in this case includes the acceleration/deceleration instruction message for accelerating or decelerating each of the vehicles CA and the like as the destination and the acceleration information indicating the above acceleration calculated for each of the vehicles CA and the like as described above.

Then, the processing unit 10 of the own vehicle shifts to the above step S8 and executes the control described above.

For example, in a case where the vehicle Ca traveling on the side lane SR tries to enter and merge into the main lane MR at the merging position MP of the main lane MR on which the vehicles CA and the like are traveling in a state illustrated in FIG. 6(*a*) (refer to a broken arrow of FIG. 6), if the vehicle Ca enters the main lane MR in the state of FIG. 6(*a*) as it is, danger may occur. However, in a case where the merging control according to the first exemplary embodiment described above with reference to FIGS. 4 and 5 is executed, an intervehicular space d illustrated in FIG. 4(*b*) is previously generated on the main lane MR by the merging control according to the first exemplary embodiment. Accordingly, the vehicle Ca can safely enter and merge into the main lane MR from the side lane SR. Note that, in FIG.

6(b), the "vehicle CA or the like identified as one caused to generate the intervehicular space" described above corresponds to at least the vehicle CE (typically, the vehicle CE and the vehicle CD), and the "other vehicle CA or the like" described above corresponds to at least the vehicle CF (typically, another vehicle C traveling further ahead of the vehicle CD and the vehicle CF).

As described above, according to the merging control according to the first exemplary embodiment, the acceleration applied to each of the vehicles CA and the like in a case where the intervehicular space d between the vehicles CA and the like where the vehicle Ca or the like can enter is generated on the main lane MR is calculated on the basis of the vehicle information or the like corresponding to each of the vehicles CA and the like and the vehicle Ca or the like. Then, the vehicle CA or the like is caused to generate the intervehicular space d on the basis of the acceleration, and the vehicle Ca or the like is moved to the position of the intervehicular space d. Thus, the intervehicular space d between the vehicles CA and the like where the vehicle Ca or the like can enter is automatically generated on the basis of the calculation result of the acceleration applied to each of the vehicles CA and the like. Thus, it is possible to allow the vehicle Ca or the like to safely enter and merge into the main lane MR (the above effect is referred to as an effect i of the merging control according to the first exemplary embodiment).

Further, since the acceleration in a case where the intervehicular space d is generated between the vehicles CA and the like on the basis of the vehicle information or the like including at least either the occupant attribute information or the vehicle attribute information, it is possible to calculate an acceleration appropriate for each of the vehicles CA and the like to allow the vehicle Ca or the like to safely enter the main lane MR (the above effect is referred to as an effect ii of the merging control according to the first exemplary embodiment).

Figure 6B:
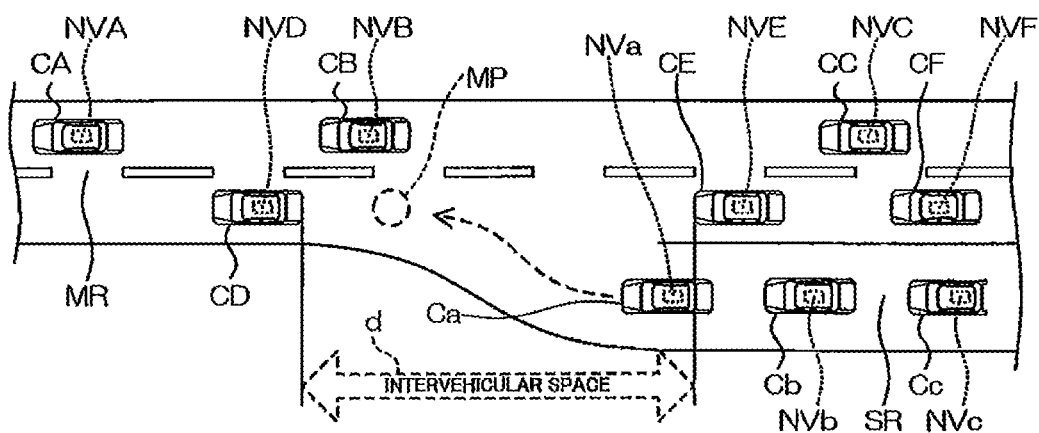

Further, the vehicle-to-vehicle communication unit 1, the calculation unit 2, and the generation unit 3 of the vehicle Ca or the like traveling on the side lane SR transmit the acceleration information and the acceleration/deceleration instruction message giving an instruction of acceleration or deceleration with the acceleration indicated by the acceleration information to at least the vehicle CE traveling behind the intervehicular space d to be generated (refer to FIG. 6(b)). Thus, it is possible to safely generate the intervehicular space d between the vehicles CA and the like under the initiative of the vehicle Ca or the like to allow the vehicle Ca or the like to enter and merge into the main lane MR.

Furthermore, in a case where the merging possible/impossible message received from the vehicle CA or the like is the merging impossible message indicating that acceleration or deceleration is impossible, the above acceleration for generating the intervehicular space d between the vehicles CA and the like is re-calculated, and new acceleration information indicating the re-calculated acceleration and new acceleration/deceleration instruction message giving an instruction of acceleration or deceleration with the re-calculated acceleration to at least the vehicle CA or the like traveling behind the intervehicular space d to be generated on the basis of the re-calculated acceleration (in FIG. 4, refer to steps S7 to S9 in the second time and thereafter). Thus, even in a case where the generation of the intervehicular space d between the vehicles CA and the like is once determined to be impossible, the intervehicular space d can be safely and reliably generated under the initiative of the vehicle Ca or the like by performing the process of generating the intervehicular space d again.

Further, when the required intervehicular space d is generated between the vehicles CA and the like, the vehicles CA and the like and the vehicle Ca or the like are caused to acquire the vehicle information or the like indicating the position of the intervehicular space d in the relationship with the position of each of the vehicles CA and the like (refer to step S11 in FIG. 4). Thus, it is possible to prevent the occurrence of a rear-end collision accident or the like in the vehicles CA and the like around the intervehicular space d and the vehicle Ca or the like (the above effect is referred to as an effect iii of the merging control according to the first exemplary embodiment).

(II) Second Exemplary Embodiment

Next, a second exemplary embodiment as another exemplary embodiment corresponding to the embodiment will be described with reference to FIGS. 7 and 8. Note that FIG. 7 is a flowchart illustrating the whole of merging control according to the second exemplary embodiment, and FIG. 8 is a flowchart illustrating details of the merging control.

Figure 7:
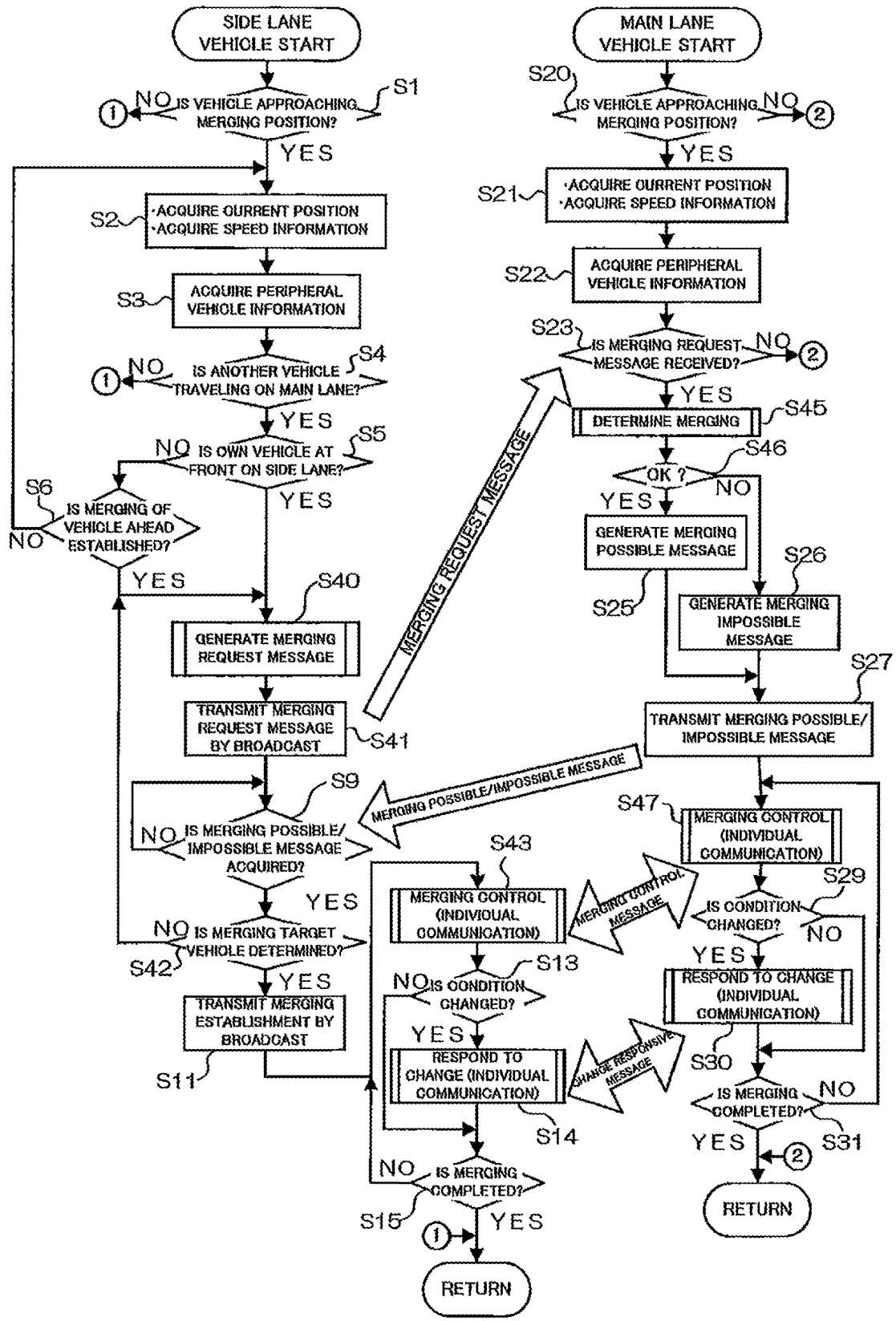
FIG. 7 is a flowchart illustrating merging control according to a second exemplary embodiment.
Figure 8:
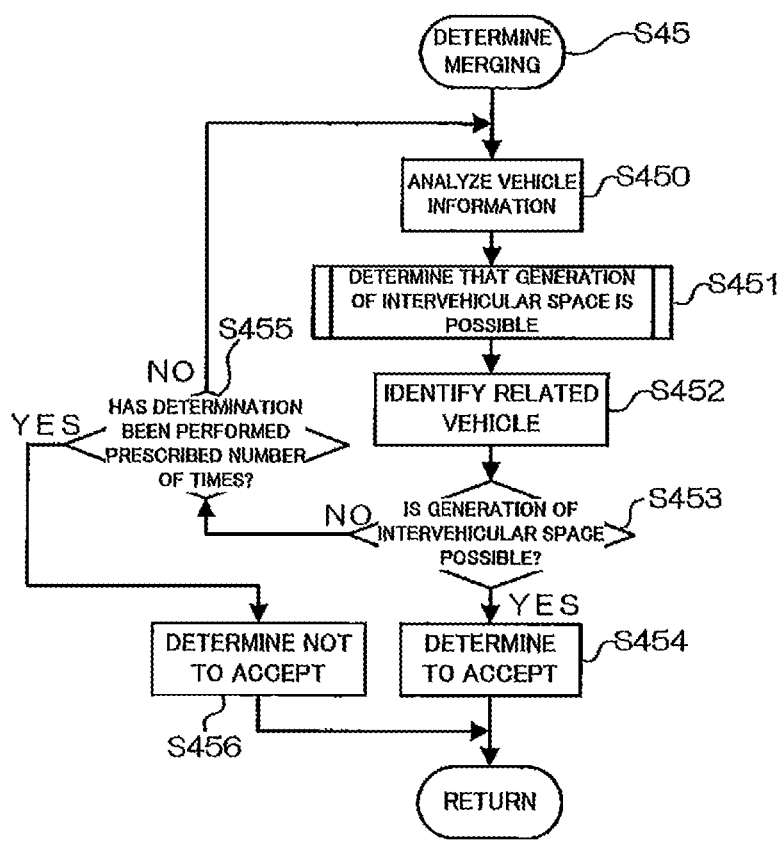
FIG. 8 is a flowchart illustrating details of the merging control according to the second exemplary embodiment.

Here, a flowchart on the left side of FIG. 7 illustrates a process executed in a navigation device which is mounted on each vehicle which is traveling on a side lane and going to enter a main lane as part of the merging control according to the second exemplary embodiment. A flowchart on the right side of FIG. 7 illustrates a process executed in a navigation device which is mounted on each vehicle which is traveling on the above main lane as part of the merging control according to the second exemplary embodiment. The process corresponding to each of the flowcharts illustrated in FIG. 7 is executed, for example, every certain time mainly by a processing unit of the navigation device.

Further, the hardware configuration of the navigation device according to the second exemplary embodiment is basically similar to the hardware configuration of the navigation device NV according to the first exemplary embodiment. Thus, in the following description of the second exemplary embodiment, the same components as the components of the navigation device NV according to the first exemplary embodiment are designated by the same reference numerals or the like, and detailed description thereof will be omitted. Further, in FIG. 7, steps of control similar to the merging control according to the first exemplary embodiment described above with reference to FIG. 4 are designated by the same step numbers, and detailed description thereof will be omitted. Further, control according to the second exemplary embodiment for allowing the vehicle Ca or the like on the side lane SR to enter the main lane MR and merge with a line of vehicles CA and the like by autonomous driving is merely referred to as "merging control according to the second exemplary embodiment."

In the merging control according to the first exemplary embodiment described above, the vehicle CA or the like traveling on the main lane MR is caused to make the intervehicular space d (refer to FIG. 6(b)) under the initiative of the vehicle Ca or the like which is traveling on the side lane SR and going to enter and merge e into the main lane MR. On the other hand, in the merging control according to the second exemplary embodiment described below, in response to a request from the vehicle Ca or the like, the vehicle Ca or the like that has made the request is allowed to enter and merge into the main lane MR from the side lane SR under the initiative of the vehicle CA or the like traveling on the main lane MR.

Specifically, as illustrated on the left of FIG. 7, when the merging control according to the second exemplary embodiment is started, the processing unit 10 of the navigation device NVa or the like, which is mounted on the vehicle Ca or the like traveling on the side lane SR, first executes steps S1 to S6 which are similar to the steps in the merging control according to the first exemplary embodiment. Then, in a case where the own vehicle is traveling at the position closest to the merging position MP in the determination in step S5 (step S5: YES), or in a case where the entry and merging into the main lane MR have been established in another vehicle Ca or the like located ahead of the own vehicle on the side lane SR in the determination in step S6 (step S6: YES), the processing unit 10 of the own vehicle then generates a merging request message requesting that the own vehicle enter and merge into the main lane MR through the merging position MP (step S40).

Here, the above merging request message generated in the merging control according to the second exemplary embodiment (step S40) differs from the merging request message generated in the merging control according to the first exemplary embodiment in that the merging request message of the second exemplary embodiment includes the request of the entry of the own vehicle into the main lane MR from the side lane SR and current vehicle information of the own vehicle, but does not include the acceleration/deceleration instruction message and the acceleration information according to the first exemplary embodiment.

Then, the processing unit 10 of the own vehicle transmits the merging request message generated in step S40 to the navigation device NV of another vehicle C traveling within the communication range by broadcast by controlling the vehicle-to-vehicle communication unit 1 (step S41). Then, the processing unit 10 of the own vehicle waits for transmission of a merging possible/impossible message responding to the merging request message transmitted in step S41 from any of the vehicles CA and the like (step S9, step S9: NO). The merging possible/impossible message is a message including information indicating whether the entry of the own vehicle indicated by the merging request message can be accepted in any of the vehicles CA and the like that have received the above merging request message according to the second exemplary embodiment (the vehicles CA and the like traveling on the main lane MR) and vehicle identification information for identifying the vehicle CA or the like that has accepted the request. The merging possible/impossible message according to the second exemplary embodiment will be described in detail later.

Next, in a case where the merging possible/impossible message has been received from any of the vehicles CA and the like during the waiting in step S9 (step S9: YES), the processing unit 10 of the own vehicle determines whether one or more vehicles CA and the like that have accepted the entry of the own vehicle into the main lane MR through the merging position MP have been determined, that is, one or more vehicles CA and the like that can make a required intervehicular space when the own vehicle reaches the merging position MP have been determined on the basis of the received merging possible/impossible message (step S42). In a case where one or more vehicles CA and the like that have accepted the merging of the own vehicle have not been determined, that is, the above required intervehicular space is not generated on the main lane MR in the determination in step S42 (step S42: NO), the processing unit 10 of the own vehicle returns to the above step S40 and repeats the control described above. On the other hand, in a case where one or more vehicles CA and the like that have accepted the merging of the own vehicle have been determined, that is, the above required intervehicular space is generated on the main lane MR in the determination in step S42 (step S42: YES), the processing unit 10 of the own vehicle then performs control similar to step S11 in the merging control according to the first exemplary embodiment.

Then, the moving unit 4 of the processing unit 10 of the own vehicle performs actual entry control into the main lane MR through the merging position MP as part of the autonomous driving of the own vehicle while individually performing exchange of a previously set merging control message or the like with the one or more vehicles CA and the like determined in step S42 by controlling the vehicle-to-vehicle communication unit 1 of the own vehicle (step S43). Then, the moving unit 4 performs control similar to steps S13 to S15 in the merging control according to the first exemplary embodiment. Here, the merging control in the above steps S43, and S13 to S15 is executed after narrowing a target finally to one vehicle CA or the like from the one or more vehicles CA and the like determined in the above step S42. More specifically, for example, the moving unit 4 preferably performs the above merging control after identifying one vehicle CA or the like capable of generating an intervehicular space that allows the own vehicle to enter and merge into the main lane MR at the earliest among the one or more vehicles CA and the like determined in above step S42. Note that, at this time, in a case where the condition of the vehicles Ca and the like and the vehicles CA and the like traveling around the own vehicle has changed (e.g., in a case where a lane change has occurred in the vehicle CA or the like traveling on the main lane MR), the merging control is performed taking the condition change into consideration (refer to step S13: YES and step S14).

On the other hand, as illustrated on the right of FIG. 7, when the merging control according to the second exemplary embodiment is started, the processing unit 10 of the navigation device NVA or the like mounted on the vehicle CA or the like traveling on the main lane MR performs control similar to steps S20 to S23 in the merging control according to the first exemplary embodiment. Then, in a case where the merging request message according to the second exemplary embodiment has been transmitted from any of the vehicles Ca and the like in the monitoring in step S23 (step S23: YES), the processing unit 10 of the navigation device NVA or the like then determines whether to accept the entry of the vehicle Ca or the like into the main lane MR based on the received merging request message (steps S45, S46). In other words, the determination in steps S45 and S46 is determination whether to accept that the vehicle Ca or the like that has transmitted the merging request message according to the second exemplary embodiment enters the main lane MR and merges with the line of the vehicles CA and the like. At this time, the processing unit 10 of the navigation device NVA or the like determines whether the intervehicular space d (refer to FIG. 6(b)) in the case where the vehicle Ca or the like identified by the vehicle identification information included in the received merging request message (refer to step S23 in FIG. 7: YES) is allowed to enter the main lane MR through the merging position MP can be made (generated, the same applies to the following description) ahead of or behind the vehicle CA or the like equipped with the navigation device NVA or the like by exchange of the vehicle information via the vehicle-to-vehicle communication unit 1 together with the calculation of an acceleration for acceleration or deceleration required to make the intervehicular space. Further, the processing unit 10 of the navigation device NVA or the like also identifies another vehicle CA or the like related to making the intervehicular space. Note that step S45 will be described in detail later with reference to FIG. 8.

Then, the processing unit 10 of the navigation device NVA or the like performs control similar to steps S25 to S27 in the merging control according to the first exemplary embodiment. In this case, the processing unit 10 of the navigation device NVA or the like transmits the merging possible/impossible message according to the second exemplary embodiment including either a merging possible message as a determination result of the above steps S45 and S46 (the message indicating that the entry and merging of the vehicle Ca or the like that has transmitted the merging request message according to the second exemplary embodiment into the main lane MR are accepted, refer to step S25) or a merging impossible message as the determination result (the message indicating that the entry and merging of the vehicle Ca or the like into the main lane MR are not accepted, refer to step S26) to any of the vehicles Ca and the like as the sender of the merging request message according to the second exemplary embodiment (step S27). At this time, the above merging possible message includes the above vehicle identification information for identifying the above other vehicle CA or the like related to making the intervehicular space together with the above vehicle identification information for identifying the vehicle CA or the like equipped with the navigation device NVA or the like including the processing unit 10 that has performed the determination of the above step S45.

Next, the moving unit 4 of the processing unit 10 of the navigation device NVA or the like performs actual entry control of the vehicle Ca or the like into the main lane MR through the merging position MP as part of the autonomous driving while performing exchange of the above merging control message or the like with the vehicle Ca or the like as the sender of the merging request message according to the second exemplary embodiment received in the above step S23 by controlling the vehicle-to-vehicle communication unit 1 of the navigation device NVA or the like (step S47). In this case, the moving unit 4 performs the actual entry control of the above vehicle Ca or the like into the main lane MR by performing exchange of the required message not only with the vehicle Ca or the like as the sender of the merging request message according to the second exemplary embodiment, but also with above other vehicle CA or the like related to making the above intervehicular space. Then, the moving unit 4 of the processing unit 10 of the navigation device NVA or the like performs control similar to steps S29 to S31 in the merging control according to the first exemplary embodiment. Here, the merging control in the above steps S47 and S29 to S31 is executed on one of the one or more vehicles CA and the like determined in the above step S42 corresponding to the merging control in steps S43 and S13 to S15 described above. Note that, also at this time, in a case where the condition of the vehicles Ca and the like and the vehicles CA and the like traveling around the own vehicle has changed (e.g., in a case where a lane change has occurred in the vehicle CA or the like traveling on the main lane MR), the merging control is performed taking the condition change into consideration (refer to step S129: YES and step S30).

Next, the merging determination as the above step S45 will be more specifically described with reference to FIG. 8. Note that, in description of the merging determination of step S45 with reference to FIG. 8, the navigation device NVA or the like that performs the merging determination is referred to as the "merging determination navigation device NV", and the vehicle CA or the like equipped with the merging determination navigation device NVA or the like is referred to as the "merging determination vehicle C".

Specifically, as illustrated in FIG. 8, in step S45, the calculation unit 2 of the processing unit 10 of the merging determination navigation device NV analyzes details of the vehicle information of the peripheral vehicles CA and the like acquired in step S22 illustrated in FIG. 7 to detect the positional relationship between each of the peripheral vehicles CA and the like and the merging determination vehicle C, a speed difference, and the position, the length, and the like of the current intervehicular space between the peripheral vehicles CA and the like (step S450). Next, the calculation unit 2 of the processing unit 10 of the merging determination vehicle C determines whether it is possible to make the intervehicular space d for allowing the vehicle Ca or the like that has transmitted the merging request message according to the second exemplary embodiment to enter and merge into the main lane MR through the merging position MP from the relationship between the merging determination vehicle C and the other peripheral vehicles CA and the like on the basis of each detection result in step S450 (step S451). At this time, the calculation unit 2 determines whether it is possible to make the intervehicular space d, for example, from the following viewpoint on the basis of the above vehicle attribute or the above occupant attribute of the merging determination vehicle C and the other vehicles CA and the like in a manner similar to step S71 in the merging control according to the first exemplary embodiment.

The intervehicular space d is not made behind the merging determination vehicle C in a case where the merging determination vehicle C is a vehicle that obstructs the forward visibility of the vehicle Ca or the like that has transmitted the merging request message according to the second exemplary embodiment in a case where the vehicle Ca or the like is allowed to merge behind the merging determination vehicle C (e.g., in a case where the merging determination vehicle C is a large vehicle).

The intervehicular space d is not made ahead of the merging determination vehicle C in which the driver is an elderly person or an infant is riding.

The intervehicular space d is not made at a position where the vehicle Ca or the like that has transmitted the merging request message according to the second exemplary embodiment requires hard acceleration or deceleration.

The intervehicular space d is made in a case where the vehicle Ca or the like that has transmitted the merging request message according to the second exemplary embodiment can enter and merge at the earliest by making the intervehicular space d ahead of the merging determination vehicle C compared to the other vehicles CA and the like.

Further, the calculation unit 2 also calculates an acceleration applied to the merging determination vehicle C when the merging determination vehicle C is accelerated or decelerated to make the intervehicular space d ahead of or behind the merging determination vehicle C.

Next, in a case where it is determined that it is possible to make the intervehicular space d ahead of or behind the merging determination vehicle C (refer to step S451), the calculation unit 2 identifies other vehicles CA and the like related to the merging determination vehicle C (step S452). Here, the identified other vehicles CA and the like include at least other vehicles CA and the like traveling immediately ahead of and behind the merging determination vehicle C which makes the intervehicular space d. Here, in a case where the merging determination vehicle C is decelerated to make the intervehicular space d ahead of the merging determination vehicle C, it is important to identify another vehicle CA or the like traveling immediately behind the merging determination vehicle C. On the other hand, in a case where the merging determination vehicle C is accelerated to make the intervehicular space d behind the merging determination vehicle C, it is important to identify another vehicle CA or the like traveling immediately ahead of the merging determination vehicle C. Note that the calculation unit 2 may further identify vehicles CA and the like traveling ahead of or behind the other vehicles CA and the like traveling immediately ahead of and behind the merging determination vehicle C as the above related other vehicles CA and the like. Here, in a case where it is also necessary to accelerate or decelerate the identified other vehicles CA and the like, the calculation unit 2 also calculates an acceleration applied in the acceleration or deceleration.

Further, in a case where it is not possible to make the intervehicular space d ahead of or behind the merging determination vehicle C in the above steps S451 and S452 (step S453, step S453: NO), the calculation unit 2 determines whether steps S450 to S453 have been repeatedly executed the number of attempt times which is previously set as the number of attempts of the determination whether it is possible to make the intervehicular space d (step S455). In a case where the intervehicular space d cannot be made even after the above number of attempt times in the determination in step S455 (step S455: YES), the calculation unit 2 determines that it is not possible to accept the entry and merging of the vehicle Ca or the like that has transmitted the merging request message according to the second exemplary embodiment into the main lane MR at this point (step S456), and shifts to the above step S46. On the other hand, in a case where the determination whether it is possible to make the intervehicular space d has not been attempted the above number of attempt times in the determination of step S455 (step S455: NO), the calculation unit 2 returns to the above step S450 and repeats the control described above.

On the other hand, in a case where it is possible to make the intervehicular space d ahead of or behind the merging determination vehicle C in the determination in step S453 (step S453: YES), the calculation unit 2 determines that the entry and merging of the vehicle Ca or the like that has transmitted the merging request message according to the second exemplary embodiment into the main lane MR are accepted (step S454), and shifts to the above step S46.

As described above, according the merging control according to the second exemplary embodiment, in addition to the above effects i) to iii) of the merging control according to the first exemplary embodiment, it is possible to more safely form the intervehicular space d and allow the vehicle Ca or the like that has transmitted the merging request message according to the second exemplary embodiment to enter and merge into the main lane MR by executing the control of the entry and merging of the vehicle Ca or the like into the main lane MR under the initiative of the vehicle CA or the like.

Note that, although each of the exemplary embodiments described above describes the case where the vehicles C are traveling on the main lane MR and the side lane SR, alternatively, the embodiment can also be applied to control of merging into the main lane MR in a case where motorcycles capable of performing autonomous driving are traveling on the main lane MR and the side lane SR.

Further, programs corresponding to the flowcharts respectively illustrated in FIGS. 4, 5, 7, and 8 may be previously recorded in an external recording medium, such as an optical disk or a hard disk, or acquired via a network, such as the Internet, and read to a general-purpose microcomputer or the like and executed. Accordingly, the microcomputer or the like can also be caused to function as the processing unit 10 according to each of the exemplary embodiments.

EXPLANATION OF REFERENCE NUMERALS

1 acquisition means (vehicle-to-vehicle communication unit)
2 calculation unit
3 generation unit
4 moving unit
10 determination means (processing unit)
S determination device
CA, CB, CC, CD, CE, CF, CG, Ca, Cb, Cc vehicle
NV, NVA, NVB, NVC, NVD, NVE, NVF, NVG, NVa, NVb, NVc navigation device
MR main lane
SR side lane
MP merging position

The invention claimed is:

1. A determination device comprising:
a processor coupled to a memory storing instructions, the processor being configured to:
acquire state information indicating a moving state of each of a plurality of first moving objects moving in a same direction on a first road and a moving state of a second moving object moving on a second road, the second road merging with the first road, and going to enter the first road and move in the direction;
determine whether a space for allowing the second moving object to enter the first road can be generated on the basis of an acceleration applied to at least one of the plurality of first moving objects to generate the space and occupant attribute information, the acceleration being on the basis of the state information and the occupant attribute information being included in the state information of each of the plurality of first moving objects; and
cause the second moving object to enter the space on the basis of the determination by the processor.

2. The determination device according to claim 1, wherein the processor is further configured to calculate the acceleration on the basis of the state information.

3. The determination device according to claim 1, wherein the processor further acquires request information requesting generation of the space from the second moving object,
wherein the processor further transmits, in a case where the request information has been acquired, possible/impossible information indicating whether the generation of the space is possible or impossible to the second moving object that has transmitted the request information, and
wherein the processor is included in the at least one of the first moving objects.

4. The determination device according to claim 3, wherein the processor further acquires confirmation information transmitted from the second moving object, and
the processor is further configured to control moving of the at least one of the first moving objects so that the space is generated on a basis of the acceleration in a case where the confirmation information according to the possible/impossible information indicating that the generation of the space is possible has been acquired by the processor.

5. The determination device according to claim 1, wherein the processor is further configured to cause the first moving objects and the second moving object to acquire space position information indicating a position of the space in a relationship with a position of each of the first moving objects in a case where the space is generated.

6. The determination device according to claim 1, wherein the acceleration includes an acceleration value detected by an acceleration sensor.

7. A determination method executed in a determination device comprising a processor coupled to a memory, the method comprising:

acquiring, by the processor, state information indicating a moving state of each of a plurality of first moving objects moving in a same direction on a first road and a moving state of a second moving object moving on a second road, the second road merging with the first road, and going to enter the first road and move in the direction;

determining, by the processor, whether a space for allowing the second moving object to enter the first road can be generated on the basis of an acceleration applied to at least one of the plurality of first moving objects to generate the space and occupant attribute information, the acceleration being on the basis of the state information and the occupant attribute information being included in the state information of each of the plurality of first moving objects; and causing the second moving object to enter the space on the basis of the determination by the processor.

* * * * *